United States Patent [19]

Nyquist

[11] Patent Number: 4,760,898

[45] Date of Patent: Aug. 2, 1988

[54] ARMATURE ASSEMBLY

[75] Inventor: Stephen Nyquist, Simsbury, Conn.

[73] Assignee: Inertia Dynamics, Inc., Collinsville, Conn.

[21] Appl. No.: 25,530

[22] Filed: Mar. 13, 1987

[51] Int. Cl.$^4$ .................................... F16D 65/10
[52] U.S. Cl. ......................... 188/161; 188/73.2; 188/218 XL; 192/107 T
[58] Field of Search ........ 188/218 R, 218 XL, 218 A, 188/73.1, 73.2, 161; 192/107 R, 107 T, 107 M, 108

[56] References Cited

U.S. PATENT DOCUMENTS

| | | | |
|---|---|---|---|
| 3,485,530 | 12/1969 | Reiff | 188/161 |
| 4,058,190 | 11/1977 | Garoner et al. | 188/218 XL |
| 4,078,637 | 3/1978 | Hanks | 188/73.2 |
| 4,102,438 | 7/1978 | Rancourt | 188/218 XL |

*Primary Examiner*—Andres Kashnikow
*Assistant Examiner*—Matthew C. Graham

*Attorney, Agent, or Firm*—McCormick, Paulding and Huber

[57] ABSTRACT

An armature assembly in an electromagnetically actuated braking mechanism and including a circular armature plate having a central opening defined by a circumaxial series of radially inwardly extending armature teeth. The inner ends of the armature teeth cooperate to define a coaxial crest circle. A plastic hub, molded in place on the armature plate, substantially encapsulates the armature teeth and has a coaxial central opening defined by a circumaxial series of spline teeth which define a root circle having a diameter greater than the diameter of the crest circle. Equiangularly spaced fan blades integrally connected to the central portion of the hub project radially outwardly therefrom adjacent one face of the armature plate. A resilient split clamping ring coaxially surrounds and exerts radially inwardly directed biasing force upon projecting end portions of the spline teeth which extend axially outward beyond the one face of the armature plate to urge the spline teeth into engagement with a spline on an associated shaft.

14 Claims, 3 Drawing Sheets

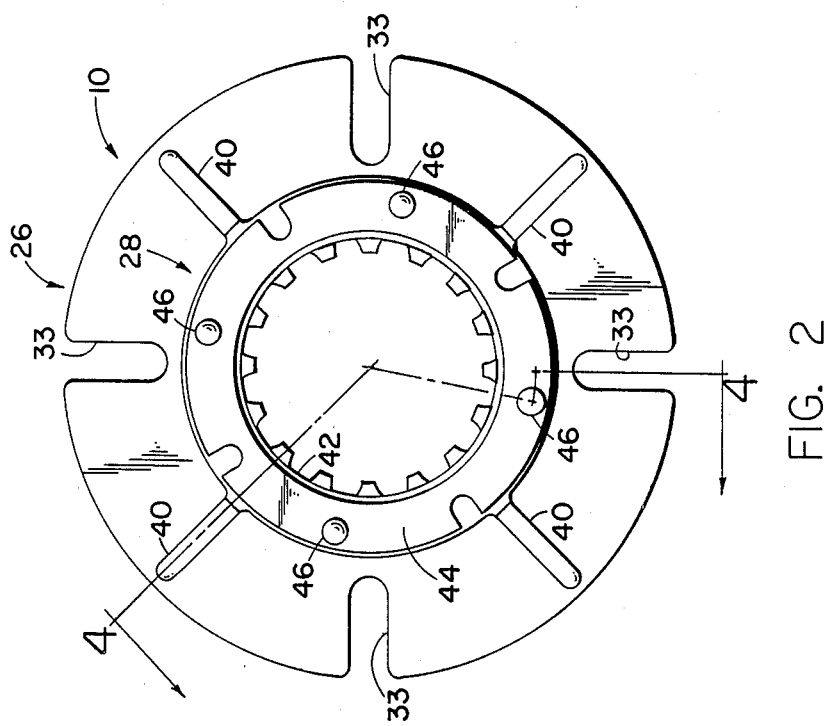
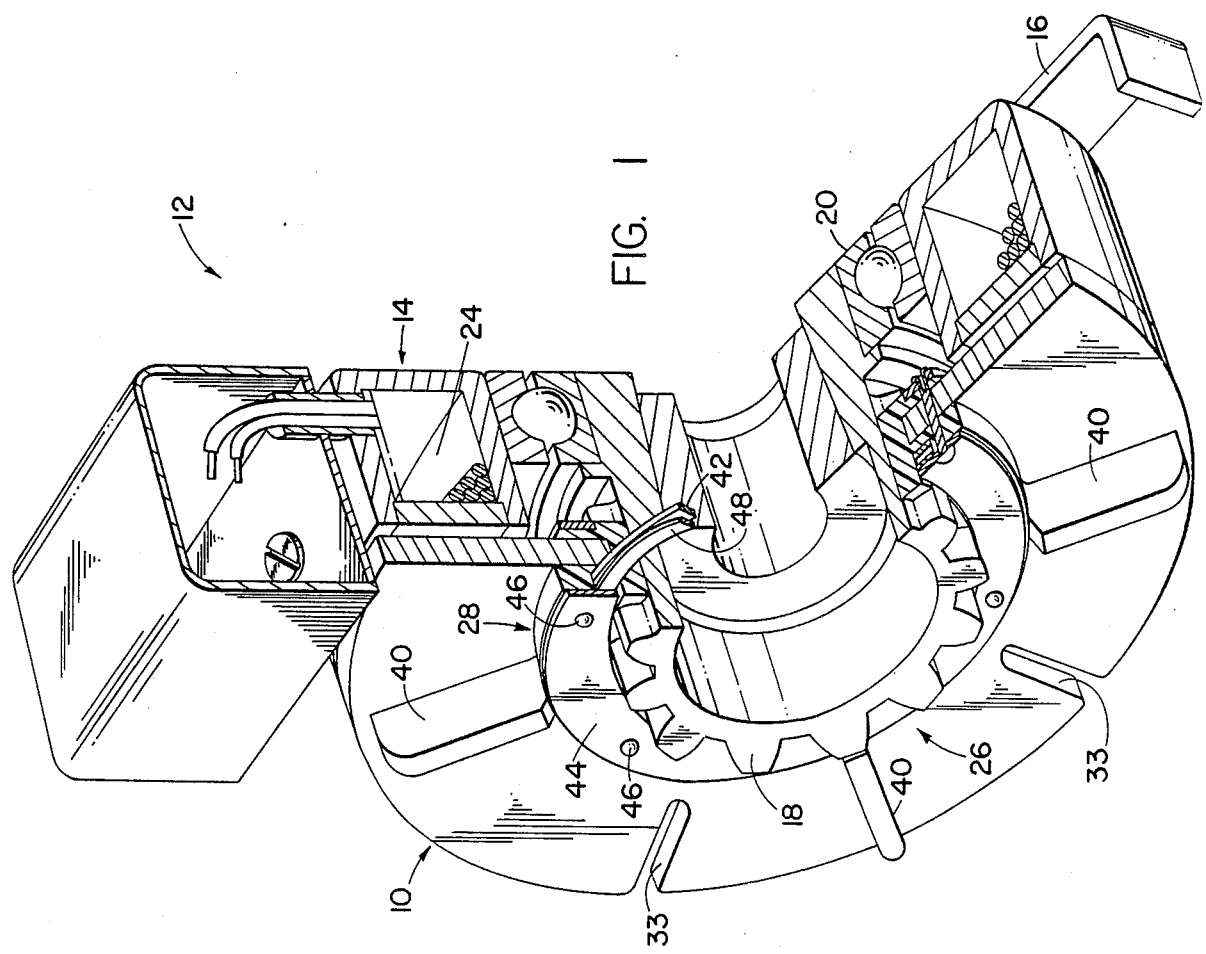

ARMATURE ASSEMBLY

BACKGROUND OF THE INVENTION

This invention relates in general to armature assemblies and deals more particularly with an improved armature assembly having a spline drive which provides positive radial connection and axial freedom relative to an associated spline shaft.

The armature assembly of the present invention is particularly adapted for use in an electromagnetically actuated clutch or brake mechanism. Such a mechanism essentially comprises two parts. One part, an annular electromagnet assembly, attracts the other part, an armature assembly, when electrical current is applied to a coil associated with the electromagnet assembly. The electromagnet assembly is or may be faced with friction material to absorb heat and retard wear. When one of the aforesaid two parts is mounted in fixed position, the system functions as a brake. However, if both parts are free to rotate the system operates as a clutch, which may, for example, comprise part of a drive transmission system. A magnetic field is generated when current flows through the magnet coil, which draws the armature assembly into direct contact with the electromagnet assembly. The strength of the magnetic field is directly proportional to the amount of current applied to the coil.

In a system of the aforedescribed general type, the armature assembly includes an armature plate, a splined hub bolted or otherwise fastened to the plate and fan blades carried by the plate. However, fastening the hub and/or the fan blades to the armature plate can cause warpage of the plate.

It is generally desirable that the hub be made from material softer than the material of the splined shaft to which it is attached to reduce risk of damage to the shaft resulting from heavy shock loads or the like. Such damage as may occur will usually be confined to the armature assembly which may be replaced more easily and at less expense than the shaft. However, axial movement of the relatively soft hub on the harder shaft often causes wear and fretting resulting in loosening of the armature assembly and vibration or chattering within the system accompanied by an increase in operational noise level. The occurrence of mechanical failure between the hub and the armature plate is often accompanied by abrupt loss of driving connection between the armature assembly its associated shaft. The result may be a total loss of braking power or coupling connection within an associated system.

The present invention is concerned with the aforedescribed general problems.

SUMMARY OF THE INVENTION

In accordance with the present invention, an improved armature assembly comprises a circular armature plate made having a central opening therethrough defined by a circumaxial series of radially inwardly projecting armature teeth. The inner ends of the armature teeth define a coaxial crest circle. The armature assembly further includes a splined hub attached in fixed position to a central portion of the armature plate. The splined hub defined by a circumaxial series of radially inwardly extending spline teeth. The radially outer extremities of the spline teeth define a root circle which has a diameter greater than the diameter of the crest circle.

BRIEF DESCRIPTION OF THE DRAWINGS

FIG. 1 is a perspective view shown partially in section and illustrating a part of an electromagnetically actuated brake mechanism having an armature assembly embodying the present invention.

FIG. 2 is a front elevational view of the armature assembly shown in FIG. 1.

DETAILED DESCRIPTION OF PREFERRED EMBODIMENT

Figure 3:
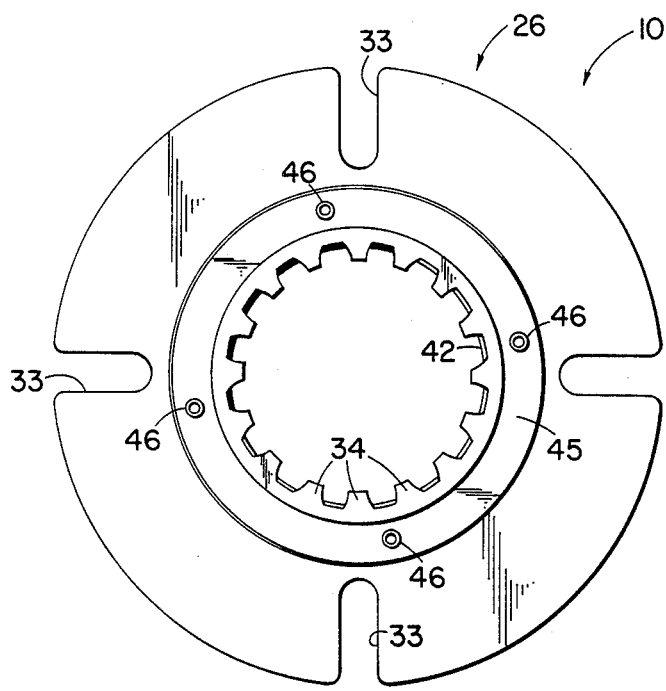
FIG. 3 is a rear elevational view of the armature assembly.

While the armature assembly of the present invention may be used in either an electromagentically actuated clutch or brake mechanism, for the purpose of illustration an armature assembly embodying the present invention and indicated generally by the reference numeral 10 is illustrated in FIG. 1 with reference to an electromagnetically actuated brake mechanism designated generally by the numeral 12.

The illustrated brake mechanism 12 includes an annular electromagnet assembly indicated generally at 14 and mounted in fixed position relative to an associated frame or housing by brackets 16 (one shown). The armature assembly 10 is mounted on a splined shaft 18 journalled for rotation relative to the electromagnet assembly 14 by a ball bearing 20. The electromagnetic member 14 is or may be faced with friction material and includes an associated magnet coil 24. The application of electrical current to the coil 24 causes the armature assembly 10 to be attracted toward and into engagement with the face of the stationary electromagnet assembly 14 to effect electromagnetic braking of the rotary shaft 18 in a manner well known in the art.

Considering now the armature assembly 10 in further detail and referring particularly to FIGS. 2-7, the illustrated armature assembly 10 essentially comprises a circular armature plate, indicated generally by the numeral 26 and a splined hub mounted in fixed position centrally of the armature plate and designated generally by the numeral 28.

Figure 6:
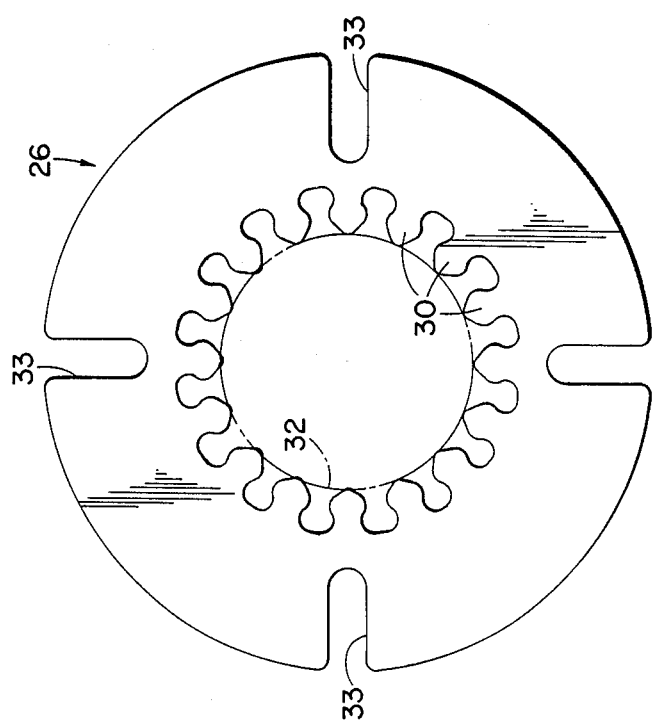
FIG. 6 is a front elevational view of the armature plate.

The armature plate 26, best shown in FIG. 6, is made from magnetic material, preferably metal, and has a central opening therethrough defined by a plurality of radially inwardly projecting armature teeth 30,30. The number and shape of the armature teeth 30,30 may vary but preferably, and as shown, the armature plate 26 has 16 armature teeth. The presently preferred shape of typical armature teeth is illustrated in 6. The inner ends of the armature teeth cooperate to define a coaxial crest circle indicated by the numeral 32. An equiangularly spaced series of radially extending slots 33,33 formed in the armature plate 26 open outward through the peripheral edge of the plate, substantially as shown.

The hub 28 is preferably made from a paramagnetic plastic material substantially softer than the material from which the metal spline shaft 18 is made. The hub is preferably molded in place on the armature plate 26 to engage and substantially encapsulate the armature teeth 30,30 which key the hub to the armature plate. A coaxial central aperture formed in the hub is defined by a circumaxial series of radially inwardly projecting spline teeth 34,34 may vary in number. However, the presently preferred hub assembly 28 has 16 spline teeth. Each spline tooth 34 is substantially radially aligned with an associated armature tooth 30. The radially outer extremities of the spline teeth 34,34 define a root circle, indicated by the numeral 36, which has a larger diameter than the crest circle 32. Consequently, the inner end portion of each armature tooth 30 projects a short distance inwardly beyond the crest circle 32, substantially as shown, for a purpose which will be hereinafter further evident.

Figure 4:
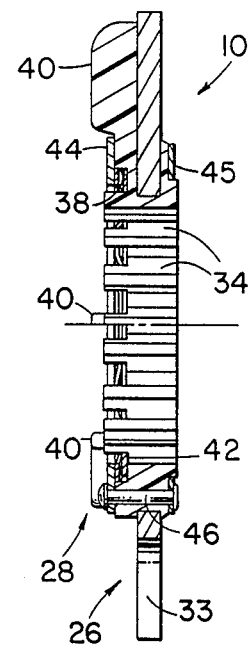
FIG. 4 is a sectional view taken generally along the line 4—4 of FIG. 2.
Figure 5:
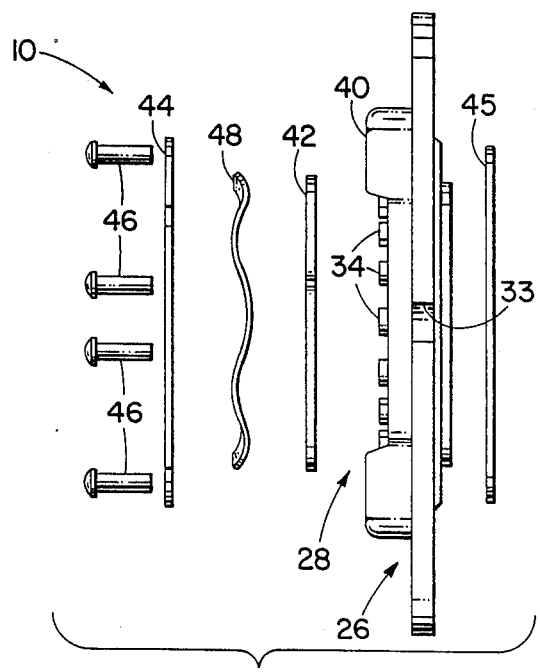
FIG. 5 is an exploded view of the armature assembly.
Figure 7:
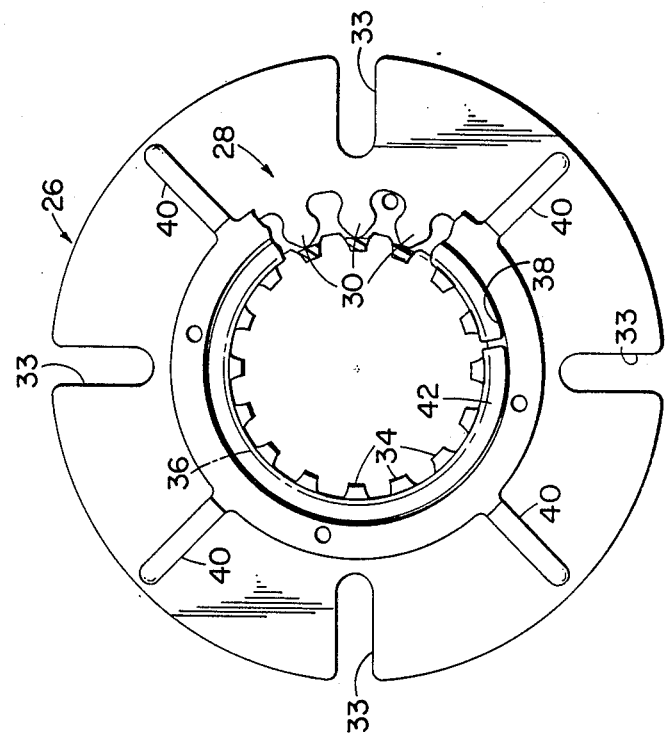
FIG. 7 is a front elevational view of the armature plate, hub and clamping ring, portions of the hub and clamping ring shown broken away.

The molded hub 28 projects outward in axially opposite directions beyond the front and rear faces of the armature plate 26 as shown in FIG. 4. The spline teeth 34,34 have projecting portions which extend outwardly beyond the front face of the armature plate 26. The hub further includes a circumaxial annular recess 38 which opens outward in a axial direction through the front face of the hub and is partially defined by the projecting portions of the spline teeth 34,34. A plurality of circumaxially arranged and equiangularly spaced fan blades 40,40 molded with and integrally connected to the central portion of the hub extend radially outwardly from the hub central portion in adjacent relation the front face of the armature plate 26. The fan blades 40,40 are preferably disposed in generally axial planes and project in axial directions from the front face of the armature plate.

A resilient split annular clamping ring 42 received within the annular recess 38 in coaxial surrounding engagement with the projecting portions of the spline teeth urge the projecting portions in radially inward directions and toward the center of the armature plate 26. Coaxially arranged flat annular washers 44 and 45 are mounted adjacent the opposite faces of the hub, substantially as shown. The flat washer 44 provides a substantial closure for the open end of the recess 38. A plurality of rivets 46,46 extend in axial directions through the armature plate 26, the hub 28, and the flat washers 44 and 46 and retain the flat washers in face-to-face relation with the opposite faces of the hub 28. An annular wave washer 48 coaxially received within the recess 38 acts between the washer 44 and the clamping ring 42 to bias the clamping ring in an axial direction and toward the inner end of the recess 38.

Molding the hub and its associated integral fan blades in position on the armature plate avoids the need for fasteners to secure the hub and blades to the plate thereby eliminating fastner stress which could cause armature plate distortion or warpage. When the armature assembly 10 is assembled in an associated electromagnetically actuated clutch or brake mechanism, the clamping ring 42 cooperates with the projecting portions of the spline teeth 34,34 to retain the teeth in firm engagement with the complementary spline shaft 18. The clamping effect of the ring 42 upon the projecting spline teeth prevents chatter or vibration resulting from normal wear. In the event of total hub failure resulting from shearing of the spline teeth, for example, the inner end portions of the armature teeth 30,30 which extend for some distance into the spaces between the spline teeth on the shaft cooperate with the latter teeth to at least temporarily maintain the integrity of the drive connection between the armature assembly 10 and its associated spline shaft 18. Thus, braking or driving power will not be abruptly lost in the event of failure of or severe damage to the armature assembly hub.

I claim:

1. An armature assembly comprising a circular armature plate having a central opening therethrough defined by a circumaxial series of radially inwardly projecting armature teeth, the inner ends of said armature teeth defining a coaxial crest circle, and a splined hub attached in fixed position to a central portion of said armature plate, said splined hub having a central aperture smaller than said central opening and defined by a circumaxial series of radially inwardly extending spline teeth, the radially outer extremities of said spline teeth defining a root circle having a diameter greater the diameter of said crest circle.

2. An armature assembly as set forth in claim 1 wherein said splined hub is keyed in fixed position to said armature plate by said armature teeth.

3. An armature assembly as set forth in claim 2 wherein said armature teeth are substantially encapsulated within said splined hub.

4. An armature assembly as set forth in claim 2 wherein said armature teeth are equal in number to said spline teeth.

5. An armature assembly as set forth in claim 1 including biasing means for urging portions of said spline teeth radially inward toward the center of said central aperture.

6. An armature assembly as set forth in claim 5 wherein said spline teeth have projecting portions extending in axial directions beyond an associated face of said armature plate.

7. An armature assembly as set forth in claim 6 wherein said biasing means comprises a generally annular biasing member coaxially surrounding and engaging said projecting portions.

8. An armature assembly as set forth in claim 7 wherein said biasing members comprises a resilient split clamping ring.

9. An armature assembly as set forth in claim 7 wherein said hub has a coaxial annular groove formed therein and opening outward in an axial direction through one face thereof and partially defined by said projecting portions and said annular biasing member is contained within said annular groove.

10. An armature assembly as set forth in claim 9 including an annular flat washer coaxially secured to said splined hub adjacent said one face and forming a substantial closure for said annular groove and an annular wave washer received within said annular groove and acting between said flat washer and said annular biasing member to urge said annular biasing member toward the inner end of said annular groove.

11. An armature assembly as set forth in claim 1 wherein said armature plate is made from one material and said splined hub is made from another material.

12. An armature assembly comprising a circular armature plate made from magnetic material and having a central opening defined by a circumaxial series of radially inwardly projecting armature teeth, said armature teeth having inner ends defining a coaxial crest circle, a splined hub made from paramagnetic material and keyed in fixed position to and centrally of said armature plate by said armature teeth, said splined hub projecting outwardly in axially opposite directions beyond the opposite faces of said armature plate and substantially encapsulating said armature teeth, said splined hub having a circumaxial series of radially inwardly projecting spline teeth equal in number to said armature teeth, said spline teeth having projecting portions extending in axially opposite directions beyond the opposite faces of said armature plate, said spline teeth defining a coaxial root circle having a diameter larger than the diameter of said crest circle, said splined hub having a coaxial annular groove formed therein and opening outward in an axial direction through an associated face thereof, said annular groove being defined in part by associated projecting portions of said spline teeth, and biasing means for urging said associated projecting portions in generally radially inward directions toward the center of said hub and including an annular biasing member received within said groove and engaging said projecting portions within said groove.

13. An armature assembly as set forth in claim 12 wherein said annular biasing member comprises a resilient split clamping ring.

14. An armature assembly comprising a circular armature plate made from one material and having a central opening defined by a circumaxially spaced series of armature teeth, the inner ends of said armature teeth cooperating to define a coaxial crest circle, a molded splined hub made from another material and mounted in fixed position on and centrally of said armature plate, said molded splined hub having a plurality of radially inwardly projecting spline teeth equal in number to said armature teeth, said spline teeth being disposed in substantial surrounding engagement with said armature teeth and defining a root circle having a diameter larger than the diameter of said crest circle, said spline teeth having circumaxially spaced apart projecting portions extending outward in axial directions beyond an associated face of said armature plate, said hub having a circumaxial annular recess opening outward in said one axial direction and partially defined by said projecting portions, means for urging said projecting portions in a radially inward directions toward the center of said hub and including a resilient split clamping ring disposed within said annular recess in coaxial surrounding engagement with said projecting portions, a flat annular washer mounted in fixed position on said splined hub in coaxial alignment with said annular recess and axially outward of said clamping ring, said flat washer forming a closure for the outer end of said annular recess, and an annular wave washer coaxially disposed within said recess and acting between said clamping ring and said flat washer, said wave washer biasing said clamping ring in an axially inward direction within said annular recess.

* * * * *